United States Patent [19]

Langer et al.

[11] 4,187,349
[45] Feb. 5, 1980

[54] BONDING OF RUBBER TO REINFORCING ELEMENTS

[75] Inventors: Heimo J. Langer, Columbus, Ohio; William J. McKillip, Crystal Lake, Ill.

[73] Assignee: Ashland Oil, Inc., Ashland, Ky.

[21] Appl. No.: 562,072

[22] Filed: Mar. 26, 1975

[51] Int. Cl.$^2$ .................. B32B 27/34; D02G 3/00
[52] U.S. Cl. .................................. 428/395; 428/292; 428/375; 428/378; 428/413; 428/474
[58] Field of Search .............. 428/378, 395, 375, 364, 428/392, 394, 413, 474, 292; 260/80.3 N, 88.3 R

[56] References Cited
U.S. PATENT DOCUMENTS

| | | | |
|---|---|---|---|
| 3,485,806 | 12/1969 | Bloomquist et al. | 260/80.3 N |
| 3,628,992 | 12/1971 | McKillip et al. | 428/413 X |
| 3,664,990 | 5/1972 | Slagel | 260/80.3 N |
| 3,715,343 | 2/1973 | Slagel et al. | 260/80.3 N |

*Primary Examiner*—Lorraine T. Kendell

[57] ABSTRACT

An adhesive system for coating polyester cord to effect the bonding of rubber thereto in preparing vulcanized reinforced structures, especially pneumatic tires, which system consists of a first heat-cured coating of an admixture of a polyepoxide and a linear carbon-to-carbon addition polymer containing pendent aminimide and N-pyrrolidonyl groups and a second heat-cured coating of a RFL composition.

4 Claims, No Drawings

4,187,349

BONDING OF RUBBER TO REINFORCING ELEMENTS

BACKGROUND OF THE INVENTION

1. Field of the Invention

This invention relates to the treatment of polyester cord to improve the bonding properties thereof when utilized as the reinforcing element in the fabrication of vulcanized rubber structures.

2. Description of the Prior Art

In the manufacture of vulcanized rubber goods reinforced with filamentary elements, particularly exemplary of which are pneumatic tires and power transmission belts, the serviceability of the resultant structures largely depends upon the strength of the adhesive bond formed between the reinforcing elements and the rubber in the course of the vulcanization step. The problem of adhesion is especially in the forefront in the manufacture of motor vehicle tires since the severe service conditions to which the structures are subjected can result in the development of extremely high temperatures and enormous dynamic stresses therein which in turn are prone to cause separation or delamination of the reinforcing element from the rubber.

The present state of the art with respect to tire cord adhesives irrespective of whether such reinforcer is polyester, nylon or steel is represented by the so-called two-dip system wherein the reinforcing element is provided with a first coating in the form of a polyoxazolidone resin and then a subsequent coating of a RFL adhesive. In accordance with this prior art, the first adhesive layer is obtained by coating the reinforcing element with an aqueous dispersion of a blocked aromatic diisocyanate and a polyepoxide and thereupon effecting the cure of these reactants in order to secure the indicated resinous structure. The aforementioned system is difficult to fault from the standpoint of the degree of adhesion it promotes. A significant disadvantage of the system, however, resides in the fact that processing problems are encountered in obtaining a uniform coating of the first applied reactive components since it is difficult to maintain a uniform dispersion of the polyisocyanate. Accordingly, there is a need for a like adhesion promoting system but wherein a preformed polymer serving as a polyisocyanate precursor is utilized in the first dip operation instead of the conventional aromatic disisocyanate.

SUMMARY OF THE INVENTION

In accordance with the present invention, a two-dip adhesive system is provided for bonding polyester cord to rubber in the manufacture of a variety of reinforced vulcanizates. In the first dip an aqueous solution of a polyepoxide and a polymer in the form of an addition polymerization product consisting essentially of a vinyl aminimide/N-vinylpyrrolidone copolymer is applied to the cord and thereupon heat cured. Following the application of said first coating, the substrate is coated with a conventional RFL composition and heat cured.

DESCRIPTION OF THE PREFERRED EMBODIMENT

The vinyl aminimides useful in the practice of this invention are the hydroxy vinyl aminimides, particularly exemplary of which is dimethyl-(2-hydroxypropyl)amine methacrylimide, and the trialkylamine methacrylimides of which trimethylamine methacrylimide represents the preferred monomer. The indicated preferences turn primarily on the economic considerations in that the specified compounds can be most conveniently prepared. Details relative to the manner in which said polymerizable hydroxy aminimides can be obtained are set forth in U.S. Pat. No. 3,485,806. The most commercially applicable method of preparing the trialkylamine methacrylimides is disclosed and claimed in U.S. Pat. No. 3,706,800. Applicable variants of the hydroxy aminimides useful herein are those in which the hydroxyl group is either capped with an acid anhydride, e.g., succinic anhydride, acetic anhydride, etc., or reacted with a lower alkylene oxide to provide an alkoxy or polyoxyalkylene group in place of the hydroxy group. In a similar manner the hydroxy vinyl aminimide/N-vinylpyrrolidone copolymer can be capped or alkoxylated.

The copolymerization of the vinyl aminimide with N-vinylpyrrolidone can be carried out in bulk or in solution. Temperatures as high as about 80° C. can be observed in conducting polymerization without any significant amount of thermolysis of the aminimide occurring. The polymerization can be effected by heating alone but is preferably initiated through the use of a conventional radical forming catalyst, e.g., azoisobutyronitrile (AIBN), or alternatively, by radiation. In some instances it is desirable to use the free radical forming catalyst in combination with a reducing agent or promoter.

The ratio of the vinyl aminimide to N-vinylpyrrolidone can be varied extensively. Generally in preparing the polymers useful herein, from about 80 to 20 parts by weight of the vinyl aminimide can be polymerized with correspondingly from 20 to 80 parts of the N-vinylpyrrolidone. More preferably, the combining ratio of co-monomers is from about 40 to 60 parts by weight of the vinyl aminimide and correspondingly from 60 to 40 parts of N-vinylpyrrolidone. While the pendent aminimide and N-pyrrolidonyl groups of the contemplated polymers herein are viewed as principally contributing to adhesive promoting characteristics thereof, the inclusion of other functional groups may be desirable either to alter certain physical properties of the polymer or to provide reactive sites to allow for a limited degree of cross-linking of polymeric units in the curing operation. Representative of monomers suitable for copolymerizing with the vinyl aminimide and the vinylpyrrolidone in this manner includes hydroxyethylacrylate, hydroxyethyl methacrylate, hydroxypropyl methacrylate, glycidyl methacrylate and diacetone acrylamide. When resorting to the use of a monomer of the foregoing type, the applicable combining ratio of vinyl aminimide and vinylpyrrolidone remains the same as previously described. However, the amount of the indicated monomers for copolymerizing therewith can be better expressed in terms of molar percentage of the total monomer makeup. On this basis the referred-to monomers can be employed in the amount of from about 2 to 20 mole percent.

The copolymer is applied to the polyester cord in the form of an aqueous solution thereof in combination with a water-soluble polyepoxide. A variety of water-soluble polyepoxides are available for this purpose. The preferred polyepoxides are the dehydrohalogenation condensation products of a polyol and at least two equivalent portions of epichlorohydrin. A particularly preferred polyol for providing water-soluble polyepoxides of the foregoing type is glycerine. The solids content of the polymer-polyepoxide solution for realizing an optimum degree of solids deposition in the first dip application is between about 5 and 15 percent by weight and depends mainly on the viscosity of such solutions. The deposited polymer-polyepoxide coating is then cured at a temperature in the order of about 450° F. for approximately a minute.

A second coating of the RFL adhesive is then applied in a similar type dip coating operation. The compositions of RFL adhesives are so well known in the art that they need not be detailed here. An exemplary formulation of this type will be shown in the following working examples which are given to illustrate the invention. All parts and percentages referred to therein are by weight unless otherwise indicated.

EXAMPLE I

Exemplary copolymers useful in the practice of this invention were prepared in the following manner:

Copolymer A

Under a nitrogen atmosphere, 33.5 parts of dimethyl-(2-hydroxypropyl)amine methacrylimide (DHA), 13.3 parts of N-vinylpyrrolidone (NVP), 46.8 parts methanol and 0.4 parts of azobisisobutyronitrile (AIBN) were sealed in a 200 ml pressure bottle. After stirring magnetically for 3.5 hours in a thermostatic bath at 70° C. the solution became very viscous. The crude polymer was isolated by precipitating with acetone to give a polymer in 82.5% yield. The IR absorption spectrum of the copolymer exhibited bands indicative of aminimide and vinylpyrrolidone residues. Polymer composition as determined by non-aqueous titration with perchloric acid was 60/40 mole percent. The polymer inherent viscosity was 0.2 dl/g in methanol.

Copolymer B

A 2-liter round bottom flask equipped with a stirrer, thermometer, reflux condenser and gas inlet tube was charged with 186.4 parts DHA, 89 parts NVP, and 26 parts hydroxyethyl methacrylate (HEMA), 300 parts methanol and 3 parts AIBN. After deaerating the contents by evacuation to incipient boiling and flushing with nitrogen, the copolymerization was carried out with stirring for five hours at 70° C. The viscous polymer solution was separated from the organic solution on a rotary evaporator and redissolved in water.

Copolymer C

A polymerization product was prepared in a similar manner as the foregoing copolymers from a monomeric mixture composed of 50 mole percent DHA, 40 mole percent NVP and 10 mole percent glycidyl methacrylate (GMA).

Copolymer D

Likewise a polymerization product was prepared from a monomeric mixture composed of 50 mole percent DHA, 40 mole percent NVP and 10 mole percent of diacetone acrylamide (DAA).

EXAMPLE II

This example serves to illustrate the effectiveness of the aforedescribed copolymers A, B, C and D for bonding a commercial grade of polyester tire cord to rubber in a conventional two-dip operation. The procedure observed in each dip consisted of (1) pretensing for the dip bath, (2) curing with a hot stretch in a horizontal heat chamber and (3) cord take-up. After the application of each dip the coated substrate was heated at 445° F. for 45 seconds.

Static adhesion of the various treated substrates was determined in accordance with the standard test ASTM Method No. D2138-72. A conventional vulcanizable rubber compound of the following recipe was employed in carrying out this test.

|  | Parts |
|---|---|
| Natural rubber No. 1 smoked sheet | 35 |
| cis-1,4-polybutadiene rubber | 20.0 |
| SBR Rubber | 67.5 |
| FEF carbon black | 55.0 |
| Zinc oxide | 10.0 |
| Stearic acid | 1.0 |
| Pine tar oil | 7.5 |
| Antioxidant BLE (Naugatuck Chem. Co.) | 0.5 |
| Sulfur | 30 |
| Benzothiazol disulfide | 1.2 |
| DPG (diphenylguanidine) | 0.2 |

The adhesive values noted for the respective test runs together with the composition of the first and second dip solutions are outlined in the following Table I. The average adhesion value specified was determined from 18 separate samples of the coated polyester cord.

TABLE I

| 1st dip composition | | | | 2nd dip composition | Avg. "H" Adhesion-lbs. |
|---|---|---|---|---|---|
| Polymer | PE[4] | Surfactant[5] | T.S.C. | | |
| 5.5 (A) | 1.8 | 0.2 | 7.5 | RF[1] 2.19%<br>Formalin - 0.72%<br>Gentac[2] 17.09%<br>H$_2$O[3] 80.00% | 35.9 |
| 5.5 (B) | 1.8 | 0.2 | 7.5 | | 35.9 |
| 5.0 (C) | — | 0.14 | 5.14 | | 37.0 |
| 4.9 (C) | 2.5 | 0.14 | 7.54 | | 40.6 |
| 5.5 (D) | 1.8 | 0.2 | 7.5 | | 28.5 |

[1]Resorcinol/HCHO fusible resin (AROFENE 779 - Ashland Chemical Co.)
[2]Vinylpyridine latex (The General Tire and Rubber Co.)
[3]Basified to PH 10.5 with NaOH and NH$_4$OH
[4]DOW XD 7160 epoxy resin (Dow Chemical Co.)
[5]AEROSOL OT (American Cyanamid Co.)

What is claimed is:

1. A rubber-reinforcing element in the form of a filamentary substrate of polyester having a heat-cured first coating comprising the reaction product of a polyepoxide and an addition polymerization product consisting essentially of a copolymer of N-vinylpyrrolidone and an aminimide selected from the group consisting of dimethyl-(2-hydroxypropyl)amine methacrylimide and trimethyl amine methacrylimide, and a heat-cured second coating of a RFL adhesive.

2. A rubber-reinforcing element in accordance with claim 1 wherein said copolymer is the addition polymerization product of from 20-80 parts by weight of N-vinylpyrrolidone and correspondingly from 80-20 parts of an aminimide selected from the group consisting of dimethyl-(2-hydroxypropyl)amine methacrylimide and trimethyl amine methacrylimide.

3. A rubber-reinforcing element in accordance with claim 2 wherein said aminimide is dimethyl-(2-hydroxypropyl)amine methacrylimide.

4. A reinforced rubber structure wherein the reinforcing element is a coated substrate in accordance with claim 3.

* * * * *